US012650489B2

(12) United States Patent　　　(10) Patent No.:　US 12,650,489 B2
　　　Obata　　　　　　　　　　　　(45) Date of Patent:　　　Jun. 9, 2026

(54) WHEEL POSITION IDENTIFYING DEVICE, WHEEL POSITION IDENTIFYING SYSTEM, AND WHEEL POSITION IDENTIFYING METHOD

(71) Applicant: Pacific Industrial Co., Ltd., Gifu-ken (JP)

(72) Inventor: Takahito Obata, Hashima (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 287 days.

(21) Appl. No.: 18/690,580

(22) PCT Filed: Aug. 29, 2022

(86) PCT No.: PCT/JP2022/032361
　§ 371 (c)(1),
　(2) Date: Mar. 8, 2024

(87) PCT Pub. No.: WO2024/047690
　PCT Pub. Date: Mar. 7, 2024

(65) Prior Publication Data
　US 2024/0377499 A1　　Nov. 14, 2024

(51) Int. Cl.
　*G01S 5/02*　　　　(2010.01)
　*B60C 23/04*　　　(2006.01)
(52) U.S. Cl.
　CPC ........ *G01S 5/0269* (2020.05); *B60C 23/0415* (2013.01)
(58) Field of Classification Search
　CPC ........... G01S 5/00; G01S 5/02; G01S 5/0269; G01M 17/00; G01M 17/0072;
　　　　　　(Continued)

(56) References Cited

U.S. PATENT DOCUMENTS

2009/0076663 A1　3/2009　Gila et al.
2014/0365162 A1　12/2014　Mori et al.
　　　　　(Continued)

FOREIGN PATENT DOCUMENTS

EP　　　　2 586 633 A1　　5/2013
JP　　2004-026062 A　　1/2004
　　　　　(Continued)

OTHER PUBLICATIONS

International Search Report dated Nov. 15, 2022, in connection with International Application No. PCT/JP2022/032361.

*Primary Examiner* — Van T Trieu
(74) *Attorney, Agent, or Firm* — Wolf, Greenfield & Sacks, P.C.

(57)　　　　　　ABSTRACT

A vehicle includes a front wheel assembly and a rear wheel assembly having different outer diameters. A wheel position identifying device includes a reception circuit and processing circuitry. The reception circuit is configured to receive a first transmission signal and a second transmission signal. The first transmission signal is transmitted from a transmitter attached to the front wheel assembly at a specific rotational position of the front wheel assembly. The second transmission signal is transmitted from a transmitter attached to the rear wheel assembly at a specific rotational position of the rear wheel assembly. The processing circuitry is configured to determine whether each of the transmitters is attached to the front wheel assembly or the rear wheel assembly based on a reception interval of the first transmission signal and a reception interval of the second transmission signal.

4 Claims, 3 Drawing Sheets

(58) Field of Classification Search
       CPC ..... B60C 23/00; B60C 23/04; B60C 23/0415;
                          B60C 23/0416; B60C 23/0488; B60T
                                                              13/00
       See application file for complete search history.

(56)                          References Cited

U.S. PATENT DOCUMENTS

| | | | |
|---|---|---|---|
| 2018/0257441 A1 | 9/2018 | Maehara | |
| 2019/0070911 A1* | 3/2019 | Tsujita | B60C 23/0488 |
| 2019/0299725 A1 | 10/2019 | Hiroaki | |
| 2021/0178840 A1* | 6/2021 | Fujii | B60C 23/0489 |
| 2022/0113132 A1* | 4/2022 | Zhang | B60C 23/0488 |

FOREIGN PATENT DOCUMENTS

| | | | |
|---|---|---|---|
| JP | 2006-111205 A | 4/2006 | |
| JP | 2013-133057 A | 7/2013 | |
| JP | 2017-058280 A | 3/2017 | |
| JP | 2019-055755 A | 4/2019 | |
| JP | 2022-056921 A | 4/2022 | |
| WO | WO 2018/131664 A1 | 7/2018 | |

* cited by examiner

Fig.5

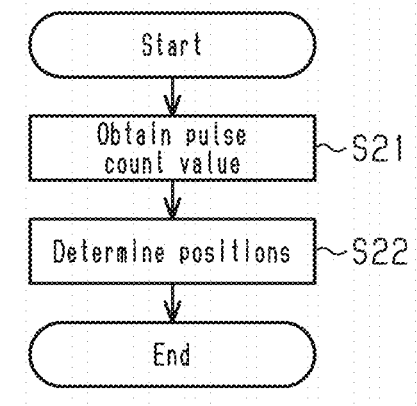

```
        ┌──────────────┐
        │    Start     │
        └──────┬───────┘
               ▼
     ┌──────────────────┐
     │  Obtain pulse    │~S21
     │  count value     │
     └────────┬─────────┘
              ▼
     ┌──────────────────┐
     │ Determine positions │~S22
     └────────┬─────────┘
              ▼
        ┌──────────────┐
        │     End      │
        └──────────────┘
```

Fig.6

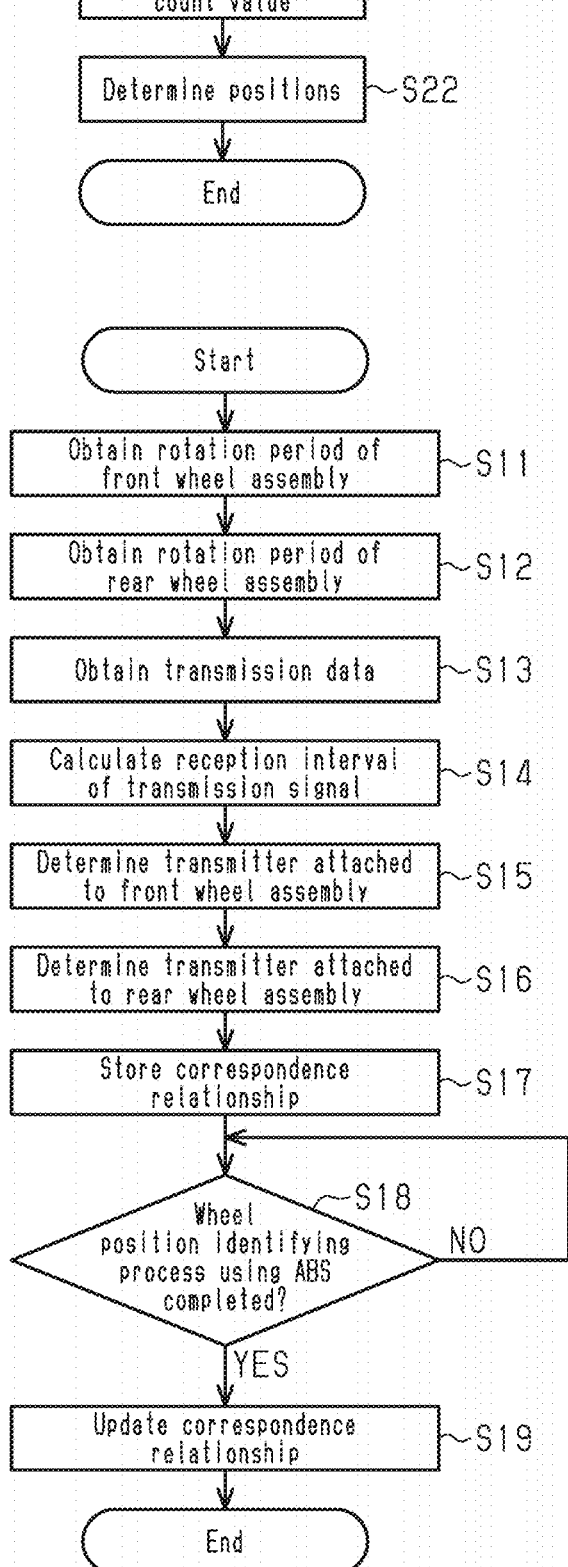

```
        ┌──────────────┐
        │    Start     │
        └──────┬───────┘
               ▼
  ┌────────────────────────────┐
  │  Obtain rotation period of │~S11
  │     front wheel assembly   │
  └────────────┬───────────────┘
               ▼
  ┌────────────────────────────┐
  │  Obtain rotation period of │~S12
  │     rear wheel assembly    │
  └────────────┬───────────────┘
               ▼
  ┌────────────────────────────┐
  │   Obtain transmission data │~S13
  └────────────┬───────────────┘
               ▼
  ┌────────────────────────────┐
  │  Calculate reception interval │~S14
  │    of transmission signal  │
  └────────────┬───────────────┘
               ▼
  ┌────────────────────────────┐
  │ Determine transmitter attached │~S15
  │    to front wheel assembly │
  └────────────┬───────────────┘
               ▼
  ┌────────────────────────────┐
  │ Determine transmitter attached │~S16
  │    to rear wheel assembly  │
  └────────────┬───────────────┘
               ▼
  ┌────────────────────────────┐
  │   Store correspondence     │~S17
  │      relationship          │
  └────────────┬───────────────┘
               ▼
         ◇ Wheel ◇  ~S18
        position identifying      NO
        process using ABS   ─────────┐
          completed?                 │
               │YES                  │
               ▼                     │
  ┌────────────────────────────┐     │
  │   Update correspondence    │~S19 │
  │      relationship          │     │
  └────────────┬───────────────┘     │
               ▼
        ┌──────────────┐
        │     End      │
        └──────────────┘
```

WHEEL POSITION IDENTIFYING DEVICE, WHEEL POSITION IDENTIFYING SYSTEM, AND WHEEL POSITION IDENTIFYING METHOD

CROSS REFERENCE TO RELATED APPLICATIONS

This Application is a national stage filing under 35 U.S.C. 371 of International Patent Application Serial No. PCT/JP2022/032361, filed Aug. 29, 2022, entitled "WHEEL POSITION IDENTIFYING DEVICE, WHEEL POSITION IDENTIFYING SYSTEM, AND WHEEL POSITION IDENTIFYING METHOD." The entire content of this application is incorporated herein by reference in its entirety.

TECHNICAL FIELD

The present disclosure relates to a wheel position identifying device, a wheel position identifying system, and a wheel position identifying method.

BACKGROUND ART

A tire condition monitoring system disclosed in Patent Literature 1 includes transmitters and a receiver. The tire condition monitoring system is mounted on a vehicle. The vehicle includes wheel assemblies. Each wheel assembly includes a wheel and a tire. The transmitters are respectively provided in the wheel assemblies. The transmitters each detect the condition of the corresponding tire. The condition of the tire is, for example, the internal pressure of the tire. The transmitters transmit transmission signals to the receiver. The receiver receives the transmission signals to recognize the conditions of the tires.

CITATION LIST

Patent Literature

Patent Literature 1: Japanese Laid-Open Patent Publication No. 2022-56921

SUMMARY OF INVENTION

Technical Problem

The receiver receives the transmission signals from the transmitters respectively provided in the wheel assemblies. In some cases, the receiver is desired to determine which of the wheel assemblies include the transmitter that has transmitted a received transmission signal.

Solution to Problem

In accordance with a first aspect of the present disclosure, a wheel position identifying device is mounted on a vehicle with a front wheel assembly and a rear wheel assembly. An outer diameter of the front wheel assembly is different from an outer diameter of the rear wheel assembly. The wheel position identifying device includes a reception circuit and an identifying device control unit. The reception circuit is configured to receive a first transmission signal and a second transmission signal. The first transmission signal is transmitted from a transmitter attached to the front wheel assembly at a specific rotational position of the front wheel assembly. The second transmission signal is transmitted from a transmitter attached to the rear wheel assembly at a specific rotational position of the rear wheel assembly. The identifying device control unit is configured to determine whether each of the transmitters is attached to the front wheel assembly or the rear wheel assembly based on a reception interval of the first transmission signal and a reception interval of the second transmission signal.

When the outer diameter of the front wheel assembly differs from the outer diameter of the rear wheel assembly, the rotation period of the front wheel assembly and the rotation period of the rear wheel assembly differ from each other. The transmission interval of the first transmission signal depends on the rotation period of the front wheel assembly. The transmission interval of the second transmission signal depends on the rotation period of the rear wheel. The identifying device control unit is capable of determining whether each of the transmitters is attached to the front wheel assembly or the rear wheel assembly by using the difference in the reception interval of the transmission signals due to the difference between the outer diameter of the front wheel assembly and the outer diameter of the rear wheel assembly.

In the above-described wheel position identifying device, the identifying device control unit is configured to obtain a rotation period of the front wheel assembly from the outer diameter of the front wheel assembly and a speed of the vehicle. The identifying device control unit is also configured to determine that, of two types of transmission signals having different reception intervals, the transmission signal having a smaller difference between the reception interval and the rotation period is the first transmission signal transmitted from the transmitter attached to the front wheel assembly.

In the above-described wheel position identifying device, the identifying device control unit is configured to obtain information indicating a rotation angle of the front wheel assembly and information indicating a rotation angle of the rear wheel assembly each time the first transmission signal and the second transmission signal are received. The identifying device control unit is also configured to determine whether each of the transmitters is attached to the front wheel assembly or the rear wheel assembly based on variation of the rotation angle of the front wheel assembly and variation of the rotation angle of the rear wheel assembly. The identifying device control unit is further configured to identify whether each of the transmitters is attached to the front wheel assembly or the rear wheel assembly based on a determination result based on the reception interval of the first transmission signal and the reception interval of the second transmission signal, and a determination result based on the variation of the rotation angle of the front wheel assembly and the variation of the rotation angle of the rear wheel assembly.

In accordance with a second aspect of the present disclosure, a wheel position identifying system is mounted on a vehicle with a front wheel assembly and a rear wheel assembly. An outer diameter of the front wheel assembly is different from an outer diameter of the rear wheel assembly. The wheel position identifying system includes transmitters respectively attached to the front wheel assembly and the rear wheel assembly, and a wheel position identifying device. The wheel position identifying device includes a reception circuit and an identifying device control unit. The reception circuit is configured to receive a first transmission signal and a second transmission signal. The first transmission signal is transmitted from a transmitter attached to the front wheel assembly at a specific rotational position of the front wheel assembly. The second transmission signal is transmitted from a transmitter attached to the rear wheel assembly at a specific rotational position of the rear wheel assembly. The identifying device control unit is configured to determine whether each of the transmitters is attached to the front wheel assembly or the rear wheel assembly based on a reception interval of the first transmission signal and a reception interval of the second transmission signal.

When the outer diameter of the front wheel assembly differs from the outer diameter of the rear wheel assembly, the rotation period of the front wheel assembly and the rotation period of the rear wheel assembly differ from each other. The transmission interval of the first transmission signal depends on the rotation period of the front wheel assembly. The transmission interval of the second transmission signal depends on the rotation period of the rear wheel. The identifying device control unit is capable of determining whether each of the transmitters is attached to the front wheel assembly or the rear wheel assembly by using the difference in the reception interval of the transmission signals due to the difference between the outer diameter of the front wheel assembly and the outer diameter of the rear wheel assembly.

In a third aspect of the present disclosure, a wheel position identifying method for a vehicle with a front wheel assembly and a rear wheel assembly is provided. An outer diameter of the front wheel assembly is different from an outer diameter of the rear wheel assembly. The wheel position identifying method includes: receiving a first transmission signal, the first transmission signal being transmitted from a transmitter attached to the front wheel assembly at a specific rotational position of the front wheel assembly; receiving a second transmission signal, the second transmission signal being transmitted from a transmitter attached to the rear wheel at a specific rotational position of the rear wheel; and identifying whether each of the transmitters is attached to the front wheel assembly or the rear wheel assembly based on a reception interval of the first transmission signal and a reception interval of the second transmission signal.

When the outer diameter of the front wheel assembly differs from the outer diameter of the rear wheel assembly, the rotation period of the front wheel assembly and the rotation period of the rear wheel assembly differ from each other. The transmission interval of the first transmission signal depends on the rotation period of the front wheel assembly. The transmission interval of the second transmission signal depends on the rotation period of the rear wheel. The wheel position identifying method is capable of determining whether each of the transmitters is attached to the front wheel assembly or the rear wheel assembly by using the difference in the reception interval of the transmission signals due to the difference between the outer diameter of the front wheel assembly and the outer diameter of the rear wheel assembly.

BRIEF DESCRIPTION OF DRAWINGS

FIG. 5 is a flowchart showing a wheel position identifying process executed by the wheel position identifying device shown in FIG. 1 using an ABS.

FIG. 6 is a flowchart showing a process executed by the wheel position identifying device of FIG. 1 when determining whether each transmitter is attached to a front wheel assembly or a rear wheel assembly.

DESCRIPTION OF EMBODIMENTS

First Embodiment

A wheel position identifying device, a wheel position identifying system, and a wheel position identifying method according to a first embodiment will now be described.

Vehicle

Figure 1:
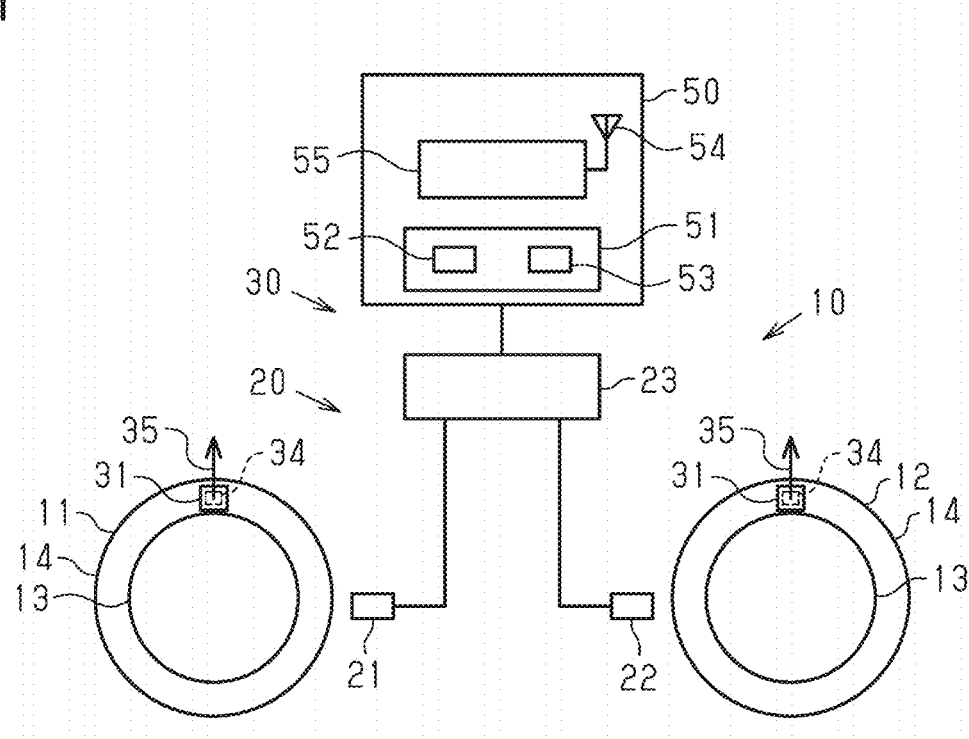
FIG. 1 is a schematic diagram showing a wheel position identifying system.

As shown in FIG. 1, a vehicle 10 includes wheel assemblies 11, 12. Each of the wheel assemblies 11, 12 includes a wheel 13 and a tire 14. The wheel assemblies 11, 12 include a front wheel assembly 11 and a rear wheel assembly 12. The vehicle 10 is a two-wheel vehicle. An outer diameter of the front wheel assembly 11 is different from an outer diameter of the rear wheel assembly 12. For example, the outer diameter of the front wheel assembly 11 differs from the outer diameter of the rear wheel assembly 12 due to the difference in tire size between the front wheel assembly 11 and the rear wheel assembly 12. The outer diameter of the front wheel assembly 11 may be larger than the outer diameter of the rear wheel assembly 12. The outer diameter of the front wheel assembly 11 may be smaller than the outer diameter of the rear wheel assembly 12. For example, in a case in which the two-wheel vehicle is a dual-purpose motor cycle or an off-roader, the outer diameter of the front wheel assembly 11 is larger than the outer diameter of the rear wheel assembly 12. For example, in a case in which the two-wheel vehicle is a sport bike, a cruiser, or a road racer, the outer diameter of the front wheel assembly 11 is smaller than the outer diameter of the rear wheel assembly 12.

The vehicle 10 may include an ABS 20. The ABS 20 is an antilock braking system.

The ABS 20 includes wheel speed sensors 21, 22. The wheel speed sensors 21, 22 detect pulses generated as the wheel assemblies 11, 12 rotate. A prescribed number of pulses are generated per rotation of each of the wheel assemblies 11, 12. The wheel speed sensors 21, 22 include a first wheel speed sensor 21 and a second wheel speed sensor 22. The first wheel speed sensor 21 is provided in correspondence with the front wheel assembly 11. The first wheel speed sensor 21 detects pulses generated as the front wheel assembly 11 rotates. The second wheel speed sensor 22 is provided in correspondence with the rear wheel assembly 12. The second wheel speed sensor 22 detects pulses generated as the rear wheel assembly 12 rotates.

The ABS 20 includes an ABS controller 23. The ABS controller 23 includes, for example, a microcomputer or the like. The ABS controller 23 obtains pulses from the wheel speed sensors 21, 22. The ABS controller 23 counts rising edges and falling edges of the pulses for each of the wheel speed sensors 21, 22. The obtained values are referred to as counted numbers of pulses. The ABS controller 23 calculates, as pulse count values, the remainders when the counted numbers of pulses are divided by the numbers of pulses per rotation of the respective wheel assemblies 11, 12.

The degree of rotation of each of the wheel assemblies 11, 12 per pulse count value is obtained so that a rotation angle of each of the wheel assemblies 11, 12 can be calculated from the pulse count value. The pulse count values are pieces of information that indicate the rotation angles of the wheel assemblies 11, 12.

Wheel Position Identifying System

The vehicle 10 includes a wheel position identifying system 30. The wheel position identifying system 30 includes transmitters 31. The transmitters 31 are respectively attached to the front wheel assembly 11 and the rear wheel assembly 12. The transmitters 31 may be attached to the respective wheel assemblies 11, 12 by being integrated with tire valves. The transmitters 31 may be attached to the tires 14 of the respective wheel assemblies 11, 12.

Figure 2:
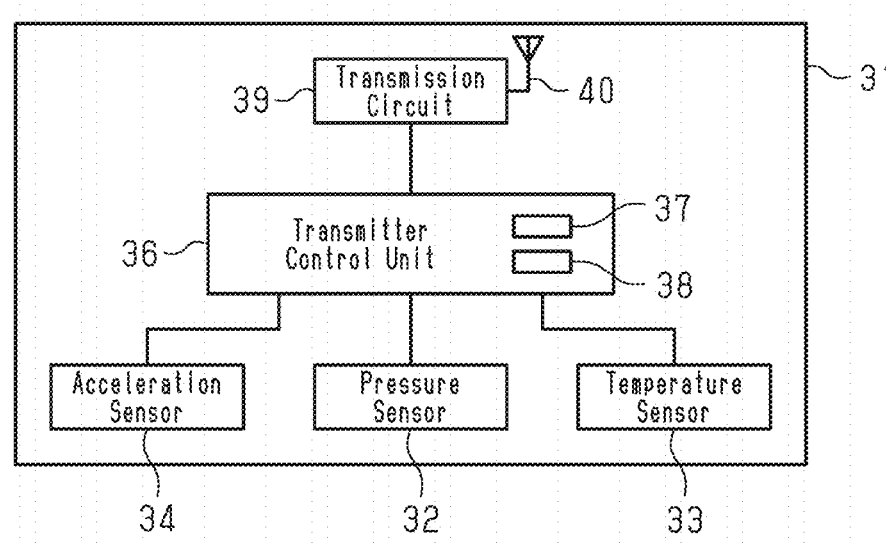
FIG. 2 is a schematic diagram showing a transmitter of the wheel position identifying system shown in FIG. 1.

As shown in FIG. 2, each transmitter 31 includes a pressure sensor 32. The pressure sensor 32 detects the internal pressure of the corresponding tire 14. The transmitter 31 includes a temperature sensor 33. The temperature sensor 33 detects the temperature inside the corresponding tire 14.

The transmitters 31 each include an acceleration sensor 34. The acceleration sensors 34 are attached to the respective wheel assemblies 11, 12 so as to detect centrifugal force generated by rotation of the wheel assemblies 11, 12. As shown in FIG. 1, each acceleration sensor 34 has a detection axis 35. The acceleration sensor 34 detects an acceleration with respect to the direction in which the detection axis 35 extends. For example, the acceleration sensor 34 is attached to the wheel assembly 11,12 such that the detection axis 35 is directed in the vertically upward direction when the transmitter 31 is located at the uppermost position in the wheel assembly 11,12.

As shown in FIG. 2, each transmitter 31 includes a transmitter control unit 36. The transmitter control unit 36 includes a processor 37 and a transmitter memory unit 38. The processor 37 may be a micro processing unit (MPU), a central processing unit (CPU), or a digital signal processor (DSP). The transmitter memory unit 38 includes a random-access memory (RAM) and a read-only memory (ROM). The transmitter memory unit 38 stores program codes or commands configured to cause the processor 37 to execute processes. The transmitter control unit 36 may include a hardware circuit such as an application specific integrated circuit (ASIC) and a field programmable gate array (FPGA). The transmitter control unit 36, which is processing circuitry, may include one or more processors that operate according to a computer program, one or more hardware circuits such as an ASIC and an FPGA, or a combination thereof. The ROM and the RAM, which are computer-readable media, include any type of media that are accessible by general-purpose computers and dedicated computers.

The transmitter memory unit 38 stores an ID code indicating individual identification information of the corresponding transmitters 31. The ID code of the transmitter 31 attached to the front wheel assembly 11 is different from the ID code of the transmitter 31 attached to the rear wheel assembly 12. The ID code of the transmitter 31 attached to the front wheel assembly 11 is referred to as a first code. The ID code of the transmitter 31 attached to the rear wheel assembly 12 is referred to as a second code.

The transmitter control unit 36 generates transmission data. The transmission data is digital data and is data of binary numbers. The transmission data includes pressure data, temperature data, and an ID code. The pressure data is data indicating the pressure detected by the pressure sensor

32. The temperature data is data indicating the temperature detected by the temperature sensor 33.

Each transmitter 31 includes a transmission circuit 39. The transmission circuit 39 performs modulation in accordance with transmission data from the transmitter control unit 36.

The transmitter 31 includes a transmission antenna 40. The transmission circuit 39 transmits a transmission signal, which is a wireless signal that has been modulated in accordance with the transmission data, from the transmission antenna 40. This causes the transmission circuit 39 to transmit a transmission signal including the ID code. The transmission signal is a signal of a prescribed frequency band. The frequency band may be an LF band, an MF band, an HF band, a VHF band, a UHF band, and a 2.4 GHz band. The transmission signal transmitted from the transmitter 31 attached to the front wheel assembly 11 is referred to as a first transmission signal. The transmission signal transmitted from the transmitter 31 attached to the rear wheel assembly 12 is referred to as a second transmission signal.

The transmitter control unit 36 executes a specific position transmission process. The specific position transmission process is executed when the vehicle 10 starts traveling after the vehicle 10 has been in a stopped state for a prescribed period of time. The prescribed period of time is set to, for example, several tens of minutes to several hours. Whether or not the vehicle 10 is traveling can be determined based on acceleration detected by the acceleration sensor 34. The centrifugal acceleration acting on the acceleration sensor 34 increases as the vehicle speed increases. If the acceleration detected by the acceleration sensor 34 is greater than or equal to a travel determination threshold, the transmitter control unit 36 determines that the vehicle 10 is traveling. If the acceleration detected by the acceleration sensor 34 is lower than the travel determination threshold, the transmitter control unit 36 determines that the vehicle 10 is in a stopped state. The travel determination threshold is set to a value greater than the acceleration detected by the acceleration sensor 34 when the vehicle 10 is in a stopped state, while taking factors such as tolerances into consideration. A process executed by the transmitter control unit 36 when executing the specific position transmission process will now be described.

Figure 3:
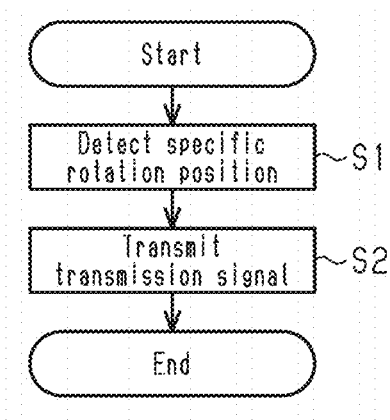
FIG. 3 is a flowchart showing a specific position transmission process executed by the transmitter shown in FIG. 2.

As shown in FIG. 3, in step S1, the transmitter control unit 36 detects that the transmitter 31 is located at a specific rotational position of the wheel assembly 11, 12. It is possible to detect that the transmitter 31 is at the specific rotational position based on the acceleration detected by the acceleration sensor 34. A centrifugal acceleration and a gravitational acceleration act on the detection axis 35. When only the gravitational acceleration is considered, the gravitational acceleration always acts downward in the vertical direction. The orientation of the detection axis 35 changes as the wheel assembly 11, 12 rotates. Thus, a gravitational acceleration component detected by the acceleration sensor 34 varies as the wheel assembly 11, 12 rotates. Unless the vehicle 10 is abruptly accelerated or abruptly stopped, the centrifugal acceleration changes only slightly during one turn of the wheel assembly 11, 12. Therefore, changes in the acceleration detected by the acceleration sensor 34 during one turn of the wheel assembly 11, 12 can be substantially regarded as changes in the gravitational acceleration component due to changes in the orientation of the detection axis 35.

When only the gravitational acceleration is considered, the gravitational acceleration component detected by the acceleration sensor 34 changes in a range between +1 [G]

and −1 [G] in one rotation of the wheel assembly 11, 12. The gravitational acceleration component detected when the detection axis 35 is oriented vertically downward is +1 [G]. The gravitational acceleration component detected when the detection axis 35 is oriented vertically upward, which is the direction opposite to the vertically downward direction, is −1 [G]. When rotation of the wheel assembly 11, 12 changes the position of the acceleration sensor 34, such that the detection axis 35 passes the position of the vertically upward orientation, the acceleration detected by the acceleration sensor 34 is switched from decreasing to increasing. Specifically, when the position of the acceleration sensor 34 changes from a position at which the detection axis 35 is oriented vertically downward to a position at which the detection axis 35 is oriented vertically upward, the acceleration detected by the acceleration sensor 34 decreases. In contrast, when the position of the acceleration sensor 34 changes from a position at which the detection axis 35 is oriented vertically upward to a position at which the detection axis 35 is oriented vertically downward, the acceleration detected by the acceleration sensor 34 increases. The transmitter control unit 36 obtains the detection result of the acceleration sensor 34 at predetermined intervals. Each time the detection result of the acceleration sensor 34 is obtained, the transmitter control unit 36 compares the obtained detection with the preceding value. A case in which the detection result of the acceleration sensor 34 has increased from the preceding value is defined as an increase, and a case in which the detection result of the acceleration sensor 34 has decreased from the preceding value is defined as a decrease. When a pattern of decrease and increase agrees with a specified pattern, the transmitter control unit 36 determines that the transmitter 31 is located at the specific rotational position at the wheel assembly 11, 12. For example, when the detection result of the acceleration sensor 34 starts increasing after decreasing, the transmitter control unit 36 determines that the transmitter 31 is at the specific rotational position. Accordingly, the transmitter control unit 36 detects that the transmitter 31 is at the specific rotational position in the wheel assembly 11, 12.

Next, in step S2, the transmitter control unit 36 transmits a wireless signal from the transmission circuit 39. In this manner, the use of the acceleration sensor 34 allows the transmitter control unit 36 to transmit a wireless signal from the transmission circuit 39 when detecting that the transmitter 31 is at the specific rotational position in the wheel assembly 11, 12. The specific rotational position in the present embodiment is a position at which the detection axis 35 is oriented vertically upward. The specific rotational position corresponds to a predetermined range that allows a margin of error. Due to various factors, the position of the transmitter 31 when the transmitter control unit 36 detects the specific rotational position typically has errors. Various factors include the frequency at which the transmitter control unit 36 obtains the detection result of the acceleration sensor 34 and detection errors of the acceleration sensor 34. The specific rotational position permits these errors. The specific rotational position can be regarded as a specific range that includes permissible range permitting errors.

As shown in FIG. 1, the wheel position identifying system 30 includes a wheel position identifying device 50. The wheel position identifying device 50 is mounted on the vehicle 10. The wheel position identifying device 50 is provided, for example, on a vehicle body.

The wheel position identifying device 50 includes an identifying device control unit 51. The identifying device control unit 51 includes a processor 52 and an identifying device memory unit 53. The processor 52 may be, for example, an MPU, a CPU, or a DSP. The identifying device memory unit 53 includes a nonvolatile memory medium that can be rewritten, a ROM, and a RAM. The identifying device memory unit 53 stores program codes or commands configured to cause the processor 52 to execute processes. The identifying device control unit 51 may include a hardware circuit such as an ASIC and an FPGA. The identifying device control unit 51, which is processing circuitry, may include one or more processors that operate according to a computer program, one or more hardware circuits such as an ASIC and an FPGA, or a combination thereof. The ROM and the RAM, which are computer-readable media, include any type of media that are accessible by general-purpose computers and dedicated computers. The identifying device control unit 51 is configured to obtain pulse count values from the ABS controller 23.

The wheel position identifying device 50 includes a reception antenna 54. The reception antenna 54 receives transmission signals transmitted from the respective transmitters 31.

The wheel position identifying device 50 includes a reception circuit 55. The reception circuit 55 demodulates the transmission signals received through the reception antenna 54 to obtain transmission data. The reception circuit 55 outputs the transmission data to the identifying device control unit 51. The identifying device control unit 51 thus obtains pressure data, temperature data, and ID codes. The identifying device control unit 51 determines whether there is an anomaly in each tire 14. For example, the identifying device control unit 51 determines whether there is an anomaly in the internal pressure of each tire 14 based on the pressure data. The identifying device control unit 51 determines whether there is an anomaly in the temperature in each tire 14 based on the temperature data. When there is an anomaly in the tire 14, the identifying device control unit 51 may issue a notification using a display unit. The display unit is located in the view of occupants of the vehicle 10.

The identifying device control unit 51 executes a wheel position identifying process. The wheel position identifying process is a process of associating the wheel assemblies 11, 12 with the ID codes of the respective transmitters 31. Associating the respective wheel assemblies 11, 12 with the ID codes of the respective the transmitters 31 can be regarded as identifying whether each of the two transmitters 31 is attached to the front wheel assembly 11 or the rear wheel assembly 12. Associating the respective wheel assemblies 11, 12 with the ID codes of the respective transmitters 31 allows the identifying device control unit 51 to display, on the display unit, the pressures of the tires 14 in association with the positions of the wheel assemblies 11, 12. Also, when there is an anomaly in any of the tires 14, the identifying device control unit 51 can display, on the display unit, the position of the tire 14 with the anomaly. The wheel position identifying process is executed, for example, when the vehicle 10 is switched from a stopped state to an activated state through an operation of a start switch. The start switch is also referred to as an ignition switch. A case will now be described in which transmission signals are transmitted by the specific position transmission process. The wheel position identifying process is executed by the identifying device control unit 51, so that whether each transmitter 31 is attached to the front wheel assembly 11 or the rear wheel assembly 12 is identified by the wheel position identifying method.

Figure 4:
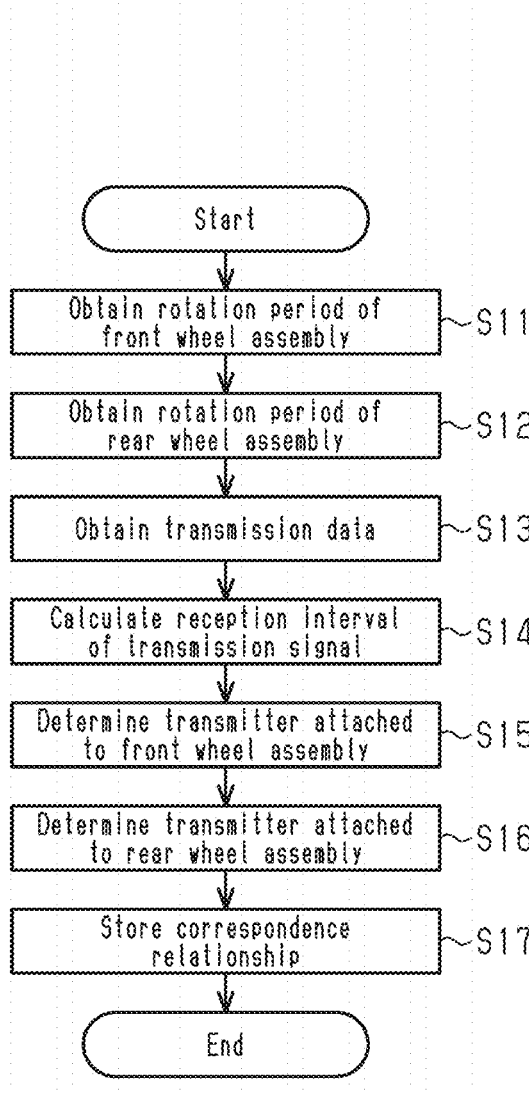
FIG. 4 is a flowchart showing a process executed by the wheel position identifying device of FIG. 1 when determining whether each transmitter is attached to a front wheel assembly or a rear wheel assembly.

As shown in FIG. 4, in step S11, the identifying device control unit 51 obtains a rotation period [msec] of the front wheel assembly 11. The identifying device control unit 51 may calculate the rotation period of the front wheel assembly 11 from the outer diameter of the front wheel assembly 11 and the speed of the vehicle 10. The outer diameter of the front wheel assembly 11 is stored in, for example, the identifying device memory unit 53. The speed of the vehicle 10 can be obtained, for example, from the ABS controller 23.

The identifying device control unit 51 may obtain the rotation period of the front wheel assembly 11 by using data that associates the speed of the vehicle 10 with the rotation period of the front wheel assembly 11. If the outer diameter of the front wheel assembly 11 is obtained in advance, the rotation period of the front wheel assembly 11 corresponding to the speed of the front wheel assembly 11 can be calculated in advance. The identifying device control unit 51 stores the calculated data in the identifying device memory unit 53 to obtain the rotation period of the front wheel assembly 11 from the speed of the vehicle 10.

Next, in step S12, the identifying device control unit 51 obtains a rotation period [msec] of the rear wheel assembly 12. The rotation period of the rear wheel assembly 12 is obtained in the same manner as the rotation period of the front wheel assembly 11. The identifying device control unit 51 may calculate the rotation period of the rear wheel assembly 12 from the outer diameter of the rear wheel 12 and the speed of the vehicle 10. Alternatively, the identifying device control unit 51 may obtain the rotation period of the rear wheel assembly 12 using data in which the rotation period of the rear wheel 12 is associated with the speed of the vehicle 10.

Next, in step S13, the identifying device control unit 51 obtains the demodulated transmission data by receiving the transmission signal from the reception circuit 55.

Next, in step S14, the identifying device control unit 51 calculates a reception interval [msec] of transmission signals for respective ID codes. When obtaining an ID code from the transmission data, the identifying device control unit 51 calculates the elapsed time from when the transmission data including the same ID code was last obtained. Accordingly, the reception interval of the transmission signal is calculated for each ID code. When obtaining the transmission data including the first code, the identifying device control unit 51 calculates the time elapsed from when the transmission data including the first code was last obtained, thereby calculating a reception interval of the first transmission signal. When obtaining the transmission data including the second code, the identifying device control unit 51 calculates the time elapsed from when the transmission data including the second code was last obtained, thereby calculating a reception interval of the second transmission signal.

Next, in step S15, the identifying device control unit 51 determines the transmitter 31 attached to the front wheel assembly 11. When the difference between the reception interval of the first transmission signal and the rotation period of the front wheel assembly 11 is less than the difference between the reception interval of the second transmission signal and the rotation period of the front wheel assembly 11, the identifying device control unit 51 determines that the transmitter 31 that has transmitted the first transmission signal is attached to the front wheel assembly 11. That is, of two types of transmission signals having different reception intervals, the identifying device control unit 51 determines that the transmission signal having a smaller difference between the reception interval and the rotation period of the front wheel assembly 11 is the first transmission signal transmitted from the transmitter 31 attached to the front wheel assembly 11. Accordingly, the identifying device control unit 51 is capable of identifying the transmitter 31 attached to the front wheel assembly 11 and associating the first code with the front wheel assembly 11.

Next, in step S16, the identifying device control unit 51 determines the transmitter 31 attached to the rear wheel assembly 12. When the difference between the reception interval of the second transmission signal and the rotation period of the rear wheel assembly 12 is less than the difference between the reception interval of the first transmission signal and the rotation period of the rear wheel assembly 12, the identifying device control unit 51 determines that the transmitter 31 that has transmitted the second transmission signal is attached to the rear wheel assembly 12. That is, of two types of transmission signals having different reception intervals, the identifying device control unit 51 determines that the transmission signal having a smaller difference between the reception interval and the rotation period of the rear wheel assembly 12 is the second transmission signal transmitted from the transmitter 31 attached to the rear wheel assembly 12. Accordingly, the identifying device control unit 51 is capable of identifying the transmitter 31 attached to the rear wheel assembly 12 and associating the second code with the rear wheel assembly 12.

Next, in step S17, the identifying device control unit 51 stores the correspondence relationship between the ID code and the wheel assemblies 11, 12 in the identifying device memory unit 53. When completing the process of step S17, the identifying device control unit 51 ends the wheel position identifying process.

Operation of First Embodiment

When the outer diameter of the front wheel assembly 11 differs from the outer diameter of the rear wheel assembly 12, the rotation period of the front wheel assembly 11 and the rotation period of the rear wheel assembly 12 differ from each other. In the specific position transmission process, each transmitter 31 transmits a transmission signal at the specific rotational position of the wheel assembly 11, 12. The time period from when the transmitter 31 is located at the specific rotational position of the wheel assembly 11, 12 to when the transmitter 31 is subsequently located at the specific rotational position of the wheel assembly 11, 12 agrees with the rotation period of the wheel assembly 11, 12. In the case of the transmitter 31 attached to the front wheel assembly 11, the time period from when the transmitter 31 is located at the specific rotational position of the front wheel assembly 11 to when the transmitter 31 is subsequently located at the specific rotational position of the front wheel assembly 11 agrees with the rotation period of the front wheel assembly 11. Therefore, the transmission interval of the first transmission signal depends on the rotation period of the front wheel assembly 11. Likewise, the transmission interval of the second transmission signal depends on the rotation period of the rear wheel assembly 12. Employing this configuration, the identifying device control unit 51 is configured to determine whether each of the transmitters 31 is attached to the front wheel assembly 11 or the rear wheel assembly 12 based on a reception interval of the first transmission signal and a reception interval of the second transmission signal.

Advantages of First Embodiment (1-1) The identifying device control unit 51 is capable of determining whether each of the transmitters 31 is attached to the front wheel assembly 11 or the rear wheel assembly 12 by using the difference in the reception interval of the transmission signals due to the difference between the outer diameter of the front wheel assembly 11 and the outer diameter of the rear wheel assembly 12.

(1-2) Of two types of transmission signals having different reception intervals, the identifying device control unit 51 determines that the transmission signal having a smaller difference between the reception interval and the rotation period of the front wheel assembly 11 is the first transmission signal. The transmission interval of the signal from the transmitter 31 attached to the front wheel assembly 11 depends on the rotation period of the front wheel assembly 11. Thus, the difference between the reception interval of the transmission signal from the transmitter 31 attached to the front wheel assembly 11 and the rotation period of the front wheel assembly 11 is smaller than the difference between the reception interval of the transmission signals from the transmitter 31 attached to the rear wheel assembly 12 and the rotation period of the front wheel assembly 11. Accordingly, of two types of transmission signals having different reception intervals, the identifying device control unit 51 determines that the transmission signal having a smaller difference between the reception interval and the rotation period of the front wheel assembly 11 is the first transmission signal.

Second Embodiment

A wheel position identifying device, a wheel position identifying system, and a wheel position identifying method according to a second embodiment will now be described. The second embodiment is different from the first embodiment in the process executed by the identifying device control unit. The second embodiment uses the wheel position identifying process of the first embodiment and a wheel position identifying process using an ABS.

The wheel position identifying process using the ABS 20 will now be described.

As shown in FIG. 5, in step S21, the identifying device control unit 51 obtains the pulse count values of the wheel speed sensors 21, 22 each time the transmission data is obtained, in other words, each time the transmission signal is received, from the ABS controller 23.

Next, in step S22, the identifying device control unit 51 performs position determination. The position determination refers to determination of whether each transmitter 31 is attached to the front wheel assembly 11 or the rear wheel assembly 12. The position determination is performed by obtaining the pulse count value each time the transmission data is obtained. In a case in which each transmitter 31 transmits a transmission signal at a specific rotational position, the rotation angle of each of the wheel assemblies 11, 12 is synchronized with the rotation angle at which the transmission signal is transmitted from one of the two transmitters 31. Thus, in a case in which each transmitter 31 transmits the transmission signal at the specific rotational position, and a pulse count value is obtained upon reception of the transmission signal, one of the wheel speed sensors 21, 22 has a small variation of the pulse count value in correspondence with each transmitter 31. The identifying device control unit 51 determines whether each transmitter 31 is attached to the wheel assembly 11 or 12 from variation of the pulse count value collected each time the transmission data is obtained. That is, the identifying device control unit 51 determines whether each transmitter 31 is attached to the wheel assembly 11 or 12 based on variation in the rotation angle of the front wheel assembly 11 when the transmission signal is received and variation in the rotation angle of the rear wheel assembly 12 when the transmission signal is received.

The identifying device control unit 51 collects pulse count values for each of the wheel speed sensors 21, 22 each time the reception circuit 55 receives a transmission signal. When the collected pulse count value falls within a prescribed range, the identifying device control unit 51 associates the wheel assembly 11, 12 corresponding to the wheel speed sensor 21, 22 that has detected the pulse count value with the transmitter 31. The prescribed range is set by taking into consideration variations of the pulse count value and is used to determine which one of the wheel speed sensors 21, 22 has smaller variation in the pulse count value. This allows the identifying device control unit 51 to determine whether each transmitter 31 is attached to the front wheel assembly 11 or the rear wheel assembly 12 using the ABS 20. For example, a case is considered in which each time the identifying device control unit 51 obtains transmission data including the first code, the pulse count values of the wheel speed sensors 21, 22 are obtained. In this case, the variation of the pulse count value of the first wheel speed sensor 21 is smaller than the variation of the pulse count value of the second wheel speed sensor 22. It is thus determined that the transmitter 31 of the first code is attached to the front wheel assembly 11.

The identifying device control unit 51 repeatedly executes the processes of step S21 and step S22 until the ID codes of the transmitters 31 are associated with the wheel assemblies 11, 12.

As shown in FIG. 6, in the same manner as the first embodiment, the identifying device control unit 51 performs the processes of steps S11 to S17 to determine whether each transmitter 31 is attached to the front wheel assembly 11 or the rear wheel assembly 12. The processes of steps S11 to S17 are performed to obtain the determination result of the wheel position identifying process based on the reception interval of the first transmission signal and the reception interval of the second transmission signal. The wheel position identifying process based on the reception interval of the first transmission signal and the reception interval of the second transmission signal is referred to as a first wheel position identifying process.

When completing the processes of steps S11 to S17, the identifying device control unit 51 executes the process of step S18. If the identifying device control unit 51 cannot determine whether each transmitter 31 is attached to the front wheel assembly 11 or the rear wheel assembly 12 through the processes of steps S11 to S17, the identifying device control unit 51 may execute the process of step S18.

In step S18, the identifying device control unit 51 determines whether the wheel position identifying process using the ABS 20 has been completed. When the determination result of step S18 is negative, the identifying device control unit 51 performs the determination of step S18 again. If the determination result of step S18 is affirmative, the identifying device control unit 51 performs the process of step S19. The identifying device control unit 51 repeats the determination of step S18 until the determination result of step S18 is affirmative. The wheel position identifying process using the ABS 20 is referred to as a second wheel position identifying process.

In step S19, the identifying device control unit 51 updates the correspondence relationship between the ID codes and the wheel assemblies 11, 12. The identifying device control unit 51 identifies whether each of the transmitters 31 is attached to the front wheel assembly 11 or the rear wheel assembly 12 based on the determination result of the first wheel position identifying process and the determination result of the second wheel position identifying process.

In the present embodiment, the identifying device control unit 51 prioritizes the determination result of the second wheel position identifying process. That is, regardless of the determination result of the first wheel position identifying process, the identifying device control unit 51 updates the correspondence relationship between the ID codes and the wheel assemblies 11, 12 with the determination result of the second wheel position identifying process.

When the determination result of the first wheel position identifying process and the determination result of the second wheel position identifying process agree with each other, the identifying device control unit 51 may update the correspondence relationship between the ID codes and the wheel assemblies 11, 12 with the agreeing determination results. When the determination result of the first wheel position identifying process and the determination result of the second wheel position identifying process do not agree, the identifying device control unit 51 may execute the first wheel position identifying process and the second wheel position identifying process again.

Advantages of Second Embodiment (2-1) The identifying device control unit 51 identifies whether each of the transmitters 31 is attached to the front wheel assembly 11 or the rear wheel assembly 12 based on the determination result of the first wheel position identifying process and the determination result of the second wheel position identifying process.

The second wheel position identifying process has a higher accuracy in determining whether each transmitter 31 is attached to the wheel assembly 11 or 12, than the first wheel position identifying process. When the determination result of the second wheel position identifying process is prioritized over that of the first wheel position identifying process, it is possible to accurately determine whether each transmitter 31 is attached to the wheel assembly 11 or 12. The first wheel position identifying process requires shorter time to determine whether each transmitter 31 is attached to the wheel assembly 11 or 12, than the second wheel position identifying process does. In the second embodiment, the determination result of the first wheel position identifying process is used until the second wheel position identifying process is completed, and the determination result of the second wheel position identifying process is used after the second wheel position identifying process is completed. This reduces the time required to determine whether each transmitter 31 is attached to the wheel assembly 11 or 12, while improving the accuracy of determination as to whether each transmitter 31 is attached to the wheel assembly 11 or 12.

In some cases, the outer diameter of the front wheel assembly 11 and the outer diameter of the rear wheel assembly 12 become the same due to replacement of at least one of the front wheel assembly 11 and the rear wheel assembly 12. In such a case, the first wheel position identifying process cannot determine whether each transmitter 31 is attached to the front wheel assembly 11 or the rear wheel assembly 12. Since the first wheel position identifying process and the second wheel position identifying process are executed, the second wheel position identifying process determines whether each of the transmitters 31 is attached to the front wheel assembly 11 or the rear wheel assembly 12 even if the first wheel position identifying process cannot determine whether each of the transmitters 31 is attached to the front wheel assembly 11 or the rear wheel assembly 12.

Modifications

The above-described embodiments may be modified as follows. The above-described embodiments and the following modifications can be combined if the combined modifications remain technically consistent with each other.

In each embodiment, the ABS 20 may include a wheel speed sensor 21, 22 corresponding to one of the front wheel assembly 11 and the rear wheel assembly 12. For example, the ABS 20 may include the first wheel speed sensor 21 corresponding to the front wheel assembly 11, but does not need to include the second wheel speed sensor 22 corresponding to the rear wheel assembly 12. In this case, in the second embodiment, the identifying device control unit 51 can determine whether only one of the two transmitters 31 is attached to the front wheel assembly 11 through the second wheel position identifying process. When determining that the transmitter 31 attached to the front wheel assembly 11 among the two transmitters 31, the identifying device control unit 51 simply needs to determine that the other transmitter 31 is attached to the rear wheel assembly 12.

In each of the embodiments, the transmitter 31 attached to the rear wheel assembly 12 does not necessarily need to be determined based on the rotation period of the rear wheel assembly 12. The process of step S15 can determine which of the two transmitters 31 is attached to the front wheel assembly 11. Therefore, the identifying device control unit 51 may determine that the other transmitter 31 is attached to the rear wheel assembly 12. Likewise, the identifying device control unit 51 may determine the transmitter 31 attached to the rear wheel assembly 12 from the rotation period of the rear wheel assembly 12, and determine that the other transmitter 31 is attached to the front wheel assembly 11.

In each of the embodiments, the identifying device control unit 51 may determine whether each transmitter 31 is attached to the front wheel assembly 11 or the rear wheel assembly 12 by comparing the reception interval of the first transmission signal and the reception interval of the second transmission signal with each other. When the outer diameter of the front wheel assembly 11 is larger than the outer diameter of the rear wheel assembly 12, the reception interval of the first transmission signal is longer than the reception interval of the second transmission signal. In this case, the identifying device control unit 51 is capable of determining that the transmitter 31 that has transmitted the transmission signal having a longer reception interval is attached to the front wheel assembly 11. The identifying device control unit 51 is capable of determining that the transmitter 31 that has transmitted the transmission signal having a shorter reception interval is attached to the rear wheel assembly 12. When the outer diameter of the front wheel assembly 11 is smaller than the outer diameter of the rear wheel assembly 12, the reception interval of the first transmission signal is shorter than the reception interval of the second transmission signal. In this case, the identifying device control unit 51 is capable of determining that the transmitter 31 that has transmitted the transmission signal having a shorter reception interval is attached to the front wheel assembly 11. The identifying device control unit 51 is capable of determining that the transmitter 31 that has transmitted the transmission signal having a longer reception interval is attached to the rear wheel assembly 12. Whether the outer diameter of the front wheel assembly 11 is larger or smaller than the outer diameter of the rear wheel assembly 12 may be stored in the identifying device memory unit 53.

In each of the embodiments, the vehicle 10 may be a four-wheel vehicle as long as the outer diameters of the front wheel assemblies 11 and the outer diameter of the rear wheel assemblies 12 are different from each other. If the vehicle 10 is a four-wheel vehicle, two types of transmission signals having different reception intervals refer to two types of transmission signals that cause substantial differences in the reception intervals due to differences in the outer diameters of the wheel assemblies. The reception intervals of transmission signals transmitted from two wheel assemblies of which the outer diameters are substantially equal to each other may have some difference in the reception intervals. However, such a difference is in the range of tolerance and not included in the substantial difference in the reception intervals.

In the second embodiment, the identifying device control unit 51 may prioritize the determination result of the first wheel position identifying process. In this case, when being unable to perform determination with the first wheel position identifying process, the identifying device control unit 51 simply needs to use the determination result of the second wheel position identifying process.

REFERENCE SIGNS LIST

10 . . . Vehicle; 11 . . . Front Wheel Assembly; 12 . . . Rear Wheel Assembly; 30 . . . Wheel Position Identifying System; 31 . . . Transmitter; 50 . . . Wheel Position Identifying Device; 51 . . . Identifying Device Control Unit; 55 . . . Reception Circuit

The invention claimed is:

1. A wheel position identifying device mounted on a two-wheel vehicle with a front wheel assembly and a rear wheel assembly, wherein an outer diameter of the front wheel assembly is different from an outer diameter of the rear wheel assembly, the wheel position identifying device comprises:

a reception circuit configured to receive a first transmission signal and a second transmission signal, the first transmission signal being transmitted from a transmitter attached to the front wheel assembly at a specific rotational position of the front wheel assembly, and the second transmission signal being transmitted from a transmitter attached to the rear wheel assembly at a specific rotational position of the rear wheel assembly; and processing circuitry, a reception interval of the first transmission signal and a reception interval of the second transmission signal are different from each other, the processing circuitry is configured to obtain a rotation period of the front wheel assembly from the outer diameter of the front wheel assembly and a speed of the vehicle, and determine that, of two types of transmission signals having different reception intervals, the transmission signal having a smaller difference between the reception interval and the rotation period is the first transmission signal transmitted from the transmitter attached to the front wheel assembly.

2. The wheel position identifying device according to claim 1, wherein the processing circuitry is configured to obtain information indicating a rotation angle of the front wheel assembly and information indicating a rotation angle of the rear wheel assembly each time the first transmission signal and the second transmission signal are received, determine whether each of the transmitters is attached to the front wheel assembly or the rear wheel assembly based on variation of the rotation angle of the front wheel assembly and variation of the rotation angle of the rear wheel assembly, and identify whether each of the transmitters is attached to the front wheel assembly or the rear wheel assembly based on a determination result based on the reception interval of the first transmission signal and the reception interval of the second transmission signal, and a determination result based on the variation of the rotation angle of the front wheel assembly and the variation of the rotation angle of the rear wheel assembly.

3. A wheel position identifying system mounted on a two-wheel vehicle with a front wheel assembly and a rear wheel assembly, wherein an outer diameter of the front wheel assembly is different from an outer diameter of the rear wheel assembly, the wheel position identifying system comprises:

transmitters respectively attached to the front wheel assembly and the rear wheel assembly; and a wheel position identifying device, the wheel position identifying device includes:

a reception circuit configured to receive a first transmission signal and a second transmission signal, the first transmission signal being transmitted from a transmitter attached to the front wheel assembly at a specific rotational position of the front wheel assembly, and the second transmission signal being transmitted from a transmitter attached to the rear wheel assembly at a specific rotational position of the rear wheel assembly; and processing circuitry, a reception interval of the first transmission signal and a reception interval of the second transmission signal are different from each other, the processing circuitry is configured to obtain a rotation period of the front wheel assembly from the outer diameter of the front wheel assembly and a speed of the vehicle, and determine that, of two types of transmission signals having different reception intervals, the transmission signal having a smaller difference between the reception interval and the rotation period is the first transmission signal transmitted from the transmitter attached to the front wheel assembly.

4. A wheel position identifying method for a two-wheel vehicle with a front wheel assembly and a rear wheel assembly, wherein an outer diameter of the front wheel assembly is different from an outer diameter of the rear wheel assembly, the wheel position identifying method comprises:

receiving a first transmission signal, the first transmission signal being transmitted from a transmitter attached to the front wheel assembly at a specific rotational position of the front wheel assembly;

receiving a second transmission signal, the second transmission signal being transmitted from a transmitter attached to the rear wheel at a specific rotational position of the rear wheel, a reception interval of the first transmission signal and a reception interval of the second transmission signal being different from each other;

obtaining a rotation period of the front wheel assembly from the outer diameter of the front wheel assembly and a speed of the vehicle; and determining that, of two types of transmission signals having different reception intervals, the transmission signal having a smaller difference between the reception interval and the rotation period is the first transmission signal transmitted from the transmitter attached to the front wheel assembly.

\* \* \* \* \*